Aug. 14, 1956    F. E. HANSELL ET AL    2,758,904
PAN RACK ASSEMBLY
Filed May 28, 1954
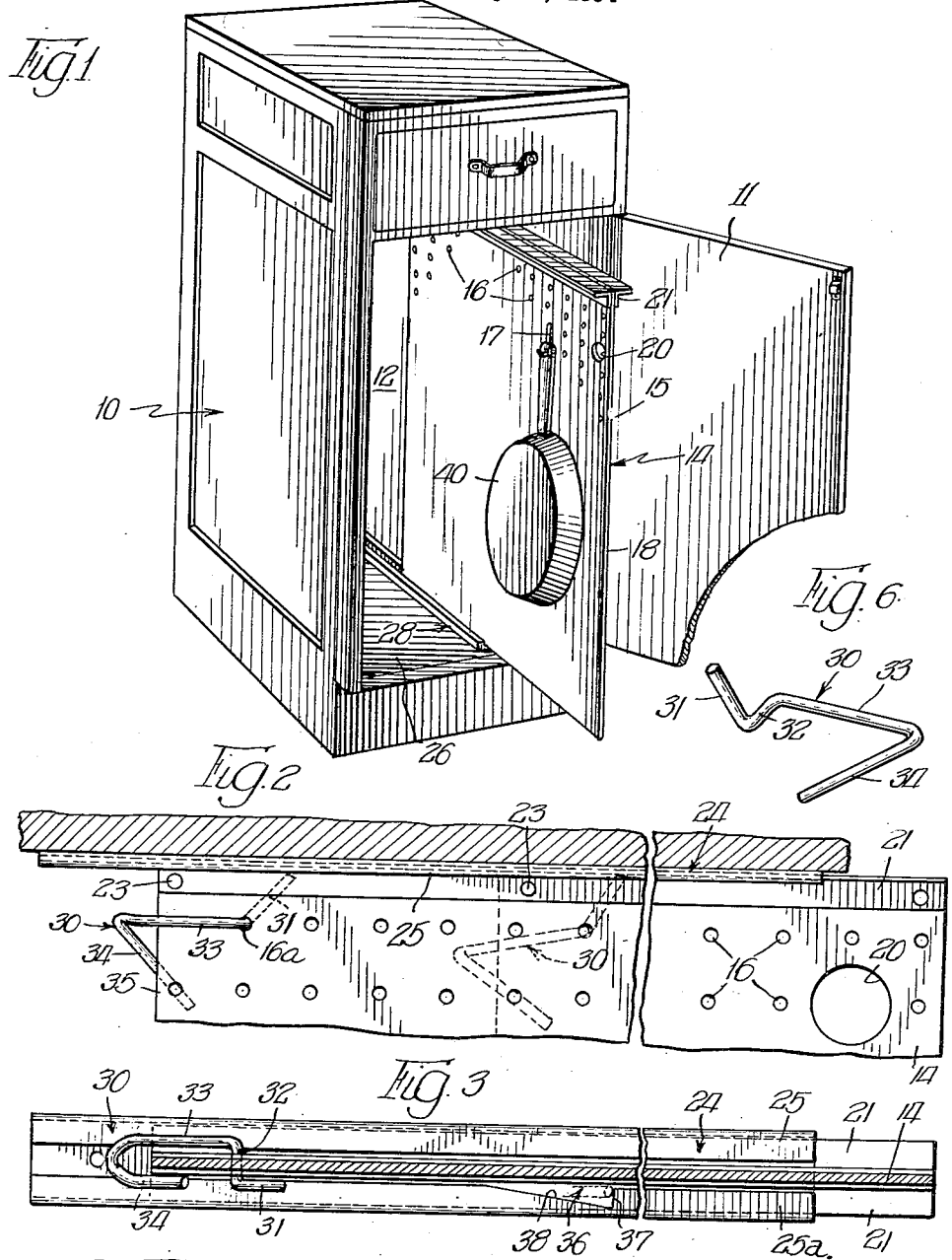
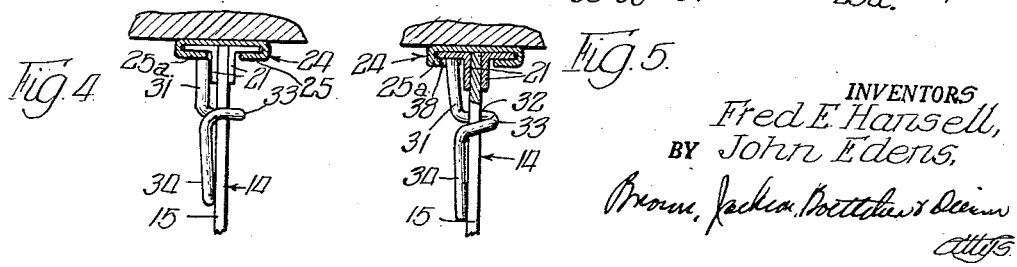
INVENTORS
Fred E. Hansell,
BY John Edens,

# United States Patent Office 2,758,904
Patented Aug. 14, 1956

2,758,904

PAN RACK ASSEMBLY

Fred E. Hansell and John Edens, Davenport, Iowa, assignors to Brammer Manufacturing Company, Davenport, Iowa, a corporation of Iowa Application May 28, 1954, Serial No. 433,055

1 Claim. (Cl. 312—348)

This invention relates generally to a new and improved rack means for the storage of pots and pans. More particularly, this invention concerns a sliding pan rack for use in assembly with kitchen cabinets and the like.

In the modern day kitchen employing pre-fabricated cabinets of compact design, the storage and hanging of pots and pans is a recognized problem. Although shelf space is available in such kitchen cabinets, pots, pans and like cooking utensils do not readily lend themselves for compact arrangement and storage on shelves. As a consequence, it is our invention to provide a more convenient and readily accessible means for the ready and convenient storage of the normal kitchen cooking utensils, especially pots and pans. It is one of the basic features of our invention to provide a pot and pan storage means whereby the normal complement of such utensils may be readily available for selection by the housewife through the use of a sliding rack carrying hanger facilities thereon; such rack being associated with an under the counter top cabinet, so that the same may be retracted into a stored condition when not in use, thereby concealing the pots and pans within the cabinet and utilizing the storage space of the cabinet with maximum effectiveness. By our means, it is possible to avail the user of far more economical use of the storage space available than has heretofore been possible with the normal counted top cabinet in which shelves are used for carrying the cooking utensils. Further, it is possible through our invention to give the housewife ready access to all of her cooking vessels at one time, thus avoiding the necessity of removing several pots and pans from a storage shelf in order to select the desired one.

The main object of our invention is to provide a new and improved pan rack for the storage and carrying of kitchen cooking vessels.

Another object of our invention is to provide a new and improved sliding pan rack for use with kitchen cabinets and which is combined with improved means for regulating its sliding movements.

A further object of our invention is to provide a new and improved sliding pan rack utilizing a perforated board which is capable of providing versatile storage arrangements for pots and pans carried thereon.

A still further object of our invention is to provide a new and improved sliding pan rack for use in kitchen cabinets and the like whereby more economical utilization of storage space in a kitchen is made possible.

The above and further objects, features and advantages of this invention will appear from time to time in the following description of its features which will be recognized readily by those familiar with the art from the pictorial representation of a preferred embodiment thereof as found in the accompanying drawings.

In the drawings:

Figure 1 is a perspective showing of a typical type of kitchen cabinet combined with or employing our improved pan rack means;

Figure 2 is an enlarged partial view in side elevation, foreshortened, demonstrating the particular means and features of regulating the sliding action of our improved pan rack;

Fig. 3 is a foreshortened bottom plan view of the assembly illustrated in Figure 2;

Figure 4 is a partial and elevational view of the sliding track arrangement for our pan rack shown in Figures 2 and 3, particularly illustrating the operational position of its elements as the rack is returned to a stored positon within the cabinet.

Figure 5 is another end elevational view similar to Figure 4, illustrating the elements of the sliding rack arrangement wherein the same is conditioned to lock the pan rack of our invention against complete withdrawal from the kitchen cabinet in which it is mounted; and Figure 6 is a perspective showing of an improved detent means utilized in our assembly for regulating the sliding action of the pan rack.

Turning now to the features of the assembly illustrated in Figure 1, it will be recognized that the same comprises a normal under the counter top type of kitchen cabinet 10 having the usual frontal hinged door 11 and enclosing a storage chamber 12. Into such a cabinet 10 the improved pan rack assembly 14 of our invention is combined substantially according to the manner illustrated in Figure 1.

With particular regard to the improved pan rack assembly 14, is will be appreciated that the same comprises in essence a substantially vertically disposed perforated storage wall member 15 having a plurality of spaced apertures 16 located at regular intervals according to a set geometric pattern, which apertures provide versatility in the position of pan hanger hooks 17, or like means.

The particular features of the storage wall 15 will be recognized as comprising essentially the features of the more familiar "Pegboard," which is formed of perforated Masonite or like material. It will also be noted that adjacent a leading edge 18 of the storage wall and near an upper top corner thereof, an enlarged finger opening 20 is provided for permitting the user to grasp the storage wall in a convenient manner when giving the same sliding impetus.

At the upper edge of wall 15 and along opposite sides thereof, are mounted a pair of substantially inverted L-shaped metal rail members 21, 21 which when combined along the upper edge of wall 15 are held rigidly or fixed thereto as by rivet means 23, form a T-shaped rail. Such rail is arranged to slide within an overlying channel member 24, best illustrated in Figures 3, 4 and 5 of the drawings, which is formed of sheet metal or the like and suitably rolled or bent to provide underhanging flange portion 25, 25a between which the wall 15 may slide with guided movement; the rail members 21 finding suspended support on the flange portions of rail 24.

Along the bottom edge of wall member 15, and extending along the bottom wall 26 of the cabinet 10, is a wooden track or guide rail means 28 comprising substantially a wooden stringer, a wooden member having a slot milled out along its length for the free passage and guided sliding movement of the wall member 15.

The above described elements comprise the major portions of our improved pan rack with the exception of a means for controlling the sliding action of the wall 15 by which we refer to means preventing complete withdrawal of the wall member as the same is slidingly moved forwardly out of the interior of the cabinet between the channel member 24 and guide rail 28. To this end we have devised a new, improved and extremely simple type of detent lock means indicated generally by numeral 30, comprising essentially a length of wire rod bent in a suitable shape to meet our intents and purposes. The shape and manner of bending detent means 30 may best be understood with reference to Figures 2 through 6 of the drawings. Basically, the member 30 comprises a locking arm portion 31, a pivot axle portion 32 contiguous transversely with portion 31, a reach arm portion 33 extending at substantially right angles from the axle portion 32, and a hook portion 34 bent re-entrantly and downwardly from the reach arm 33. It will be seen, from inspection of Figure 2 and Figure 3 in particular, that the member 30 is to be mounted adjacent the rearward edge 35 of storage wall 15 with the axle portion 32 thereof extending through an opening 16a formed in the wallboard. The locking arm portion 31 thereupon extends upwardly toward the track member 24, the reach arm 33 extends downwardly from axle 32 to merge with the hook portion 34. The hook portion reaches around the rear edge 35 of the storage wall and extends along the opposite side or face of such wall from the reach arm portion 33. It will be recognized that member 30 is arranged to pivot in opening 16a about the axis defined by axle portion 32 thereof.

In the one flange portion 25a of track member 24, which overlies the locking arm 31 of the detent member, a substantially triangular cutout slot or opening 36 is formed (see Figure 3), spaced inwardly from the rearward or trailing end of the member 24 a distance determined by the amount of withdrawal action required for the wall. That is to say, the positioning of the slot member 36 and particularly the forward wall or edge 37 therein is determined by the distance required for the pan rack to extend forwardly of the cabinet when the same is fully withdrawn therefrom as illustrated in Figure 1.

This latter described relation will better be understood by considering Figure 2 of the drawings, particularly wherein the locking and unlocking positions of detent member 30 are illustrated; the unlocked position being shown partially in full lines in this figure and the locking position thereof being shown wholly in dotted lines. Since the locking arm portion 31 of the detent member 30 extends upwardly to contact with flange 25a of the track member 24, the same will enter the triangular slotted opening 36 therein when brought opposite the same, providing the member 30 is permitted to pivot about its axle 32. This is provided for by designing the length of the reach arm 33 sufficiently to permit the same to extend beyond the rearward edge 35 of the storage wall 15. Thus when the pan rack is positioned in a stored condition within the cabinet 10, the detent member will reside in a position substantially as illustrated to the extreme left in Figure 2; that is, with the reach arm 33 thereof substantially horizontal. As the pan rack is withdrawn or pulled forwardly to a position wherein the lock arm portion 31 is capable of entering the triangular slotted opening 36, the hook portion 34 and reach arm 33 thereof will swing downwardly about the axle portion 32 to a position substantially as illustrated wholly in phantom lines in Figure 2. This causes the lock arm portion 31 conversely to swing upwardly about the axis defined by axle portion 32 to enter the slotted aperture 36. When such lock arm portion 31 is brought into engagement with the forward edge 37 of slotted aperture 36, further withdrawing action of the pan rack is effectively prevented. The two positions of the detent member 30 are best illustrated specifically in Figures 4 and 5 of the drawings, that of Figure 4 being the normal position for an unlocked condition of the detent member, as opposed to a locked position therefor, as illustrated in Figure 5.

Due to the tapered or triangular shape of aperture or slotted opening 36, reverse movement of the wall 15, or that is, the pushing thereof into or toward the inferior of the cabinet, will cause a gradual camming of the lock arm portion 31 thereof against the tapered edge 38, so that the lock arm 31 will be swung downwardly until the upper end thereof rides along the lower face of flange member 25a; this permitting free sliding movement of the pan rack into the interior of the cabinet 10 for storage.

From the above description, it will be realized and appreciated that we have provided a new and improved pan rack means capable of combination with a conventional under the counter top kitchen cabinet and the like, which, due to the perforated nature of its vertical storage wall element provides for versatile arrangement of pan hooks, such as hooks 17 for locating pan members or like cooking vessels, for example, frying pan 40 illustrated, according to the dictates and pleasures of the housewife. Also, we have provided a convenient and simple means for permitting the pan rack to be slidingly actuated in and out of the interior of the cabinet 10 between limits. In addition, the simplified arrangement comprising the detent member 30 and the slotted opening 36 in the track rail 24 gives rise to an extremely simple, but effective means for regulating the sliding movement of the pan rack forwardly out of the interior of the cabinet to prevent the same from being completely withdrawn therefrom, thus assuring that the rack is constantly engaged between the rail elements 28 and 24. Of course, it is obvious that the disengagement of detent means 30 from the overhead rail 24 upon the return of the rack to stored position within the cabinet 10 is prevented by the engagement of the rear edge 35 of wall 15 with the rear wall of the cabinet.

Therefore, we feel that our present invention presents unique advantages in a storage facility of this type, and while we have herein illustrated its concepts in relation to a particular preferred embodiment thereof, it is obvious that numerous changes, modifications, and substitutions of equivalents may be resorted to therein without necessarily departing from the spirit and scope of its inventive nature. As a result, we do not wish to be limited to the particular form of our invention herein illustrated and described, except as may appear in the following appended claim.

We claim:

For use in a pan rack assembly of the class described including a vertical storage wall having means for supporting cooking utensils and guided for rectilinear sliding movement between an overhead track means and an underlying guide means, an improved detent means for limiting sliding movement of the wall in one direction comprising, a rod like member suitably shaped and bent so that the same includes a pivotal axle portion adapted to extend transversely through the wall, a reach arm portion arranged to extend along one side of and around one edge of the wall, and a locking arm portion extending from said axle portion and adapted to extend along the opposite side of the wall from said reach arm portion; said rod member pivoting freely on its said axle portion with the reach arm portion thereof substantially preventing its displacement laterally of the wall and engaging the said one edge of the wall for limiting gravitationally imposed movement of said locking arm portion toward the overhead track means; the track means having an opening for receiving the upper end of said locking arm portion at a preselected position of sliding movement for the wall so that entry of the lock arm portion into such opening limits movement of the wall member in one direction, reverse movement of the wall member serving to automatically pivot and disengage the lock arm portion from the track means.

References Cited in the file of this patent

UNITED STATES PATENTS

| | | |
|---|---|---|
| 567,693 | Smith | Sept. 15, 1896 |
| 1,560,290 | O'Brien | Nov. 3, 1925 |
| 1,954,384 | Hurt | Apr. 10, 1934 |
| 2,254,431 | Levine | Sept. 2, 1941 |
| 2,312,985 | Bales | Mar. 2, 1943 |
| 2,608,305 | Sager | Aug. 26, 1952 |